Nov. 24, 1942.   N. E. WAHLBERG   2,302,901
POWER TRANSMISSION DEVICES
Filed Dec. 15, 1938   5 Sheets-Sheet 1

INVENTOR.
NILS ERIK WAHLBERG
BY Carl J. Barbee
ATTORNEY.

INVENTOR.
NILS ERIK WAHLBERG
BY Carl J. Barbee
ATTORNEY.

Patented Nov. 24, 1942

2,302,901

UNITED STATES PATENT OFFICE 2,302,901

POWER TRANSMISSION DEVICE

Nils Erik Wahlberg, Kenosha, Wis., assignor to Nash-Kelvinator Corporation, Kenosha, Wis., a corporation of Maryland Application December 15, 1938, Serial No. 245,820

12 Claims. (Cl. 74—484)

This invention relates to power transmission devices and particularly to controls for power transmission devices which are adapted to be employed in conjunction with automotive vehicles.

In order to provide engine speeds of an internal combustion engine, which are best suited to deliver power in accordance with the speed of the vehicle over the ground, it has been usual to provide so-called change speed transmissions which have consisted of manually selectable gear sets which are adapted to change the ratio of engine revolutions to rear or driving wheel revolutions. In the past such transmission gearings have been operable for the most part by means of a manually shiftable lever extending from a position adjacent the driver's seat at the right hand of the driver and vertically through the floor boards of the vehicle cab and into the transmission gear box where such lever is provided with a ball tip movable into engagement with gates carried by sliding rods which are adapted to shift forks for selecting the appropriate gear, thus determining the ratio of engine revolutions to rear wheel revolutions. Constructions of this nature are somewhat disadvantageous in that they require the shift lever to pass into about the middle point of the floor boards in the front or driver's compartment, thus rendering the central portion of floor space in such front compartment difficult, if not impossible, to use since the gear shift lever must be straddled or otherwise avoided by the central occupant of the front compartment. Such an arrangement tends to prevent seating of three persons in the driver's compartment in spite of adequate seating space.

An object of the present invention is to clear the floor of the gear shift lever mentioned above and to provide in its place a control member which is even more accessible than such lever.

A further object of the invention is to provide in a gear shift lever which does not extend through the floor, a means for selecting gears which utilize the apertures in the floor boards which are available at the present time and permits the driver's compartment floor boards to extend uninterruptedly from one side of the compartment to the other, there being no aperture in the central portion thereof.

An additional object of the invention is to provide in a gear selecting device of the type described above, a means for rendering the selection of gears effortless, and yet to maintain the standard H slot type of gear shift which is presently in vogue. In order to improve the ease of shifting, anti-friction types of bearings are employed throughout the perfected type of construction, which is shown in the accompanying drawings and described in the following specification.

A large number of purchasers of automotive vehicles desire special equipment in the way of power transmission. For example, some manufacturers of automotive vehicles have offered within the last few years so-called overdrive or overgear transmissions, which are brought into operation automatically if desired by the operator of the vehicle, but which may be locked out at the option of the driver. Other equipment which is presently installed in vehicles includes so-called free wheeling or overrunning clutch drives, which permit the rear wheels and drive shaft to overrun an idling motor. An additional piece of equipment, which is sometimes sold, is a second overrunning clutch which prevents retrograde movement of the vehicle when stopped from forward movement upon a hill. When devices of this type are employed it is necessary to provide some means for throwing them out of operation when the vehicle is placed in reverse gear for moving it rearwardly, and it is an object of the invention to provide means for accomplishing this end in a transmission having a control of the type hereinbefore described.

Further objects of the invention will become apparent as the description proceeds and will be pointed out more particularly in connection with the appended claims.

In the drawings forming a part of this specification and of which there are five sheets.

Figure 1:
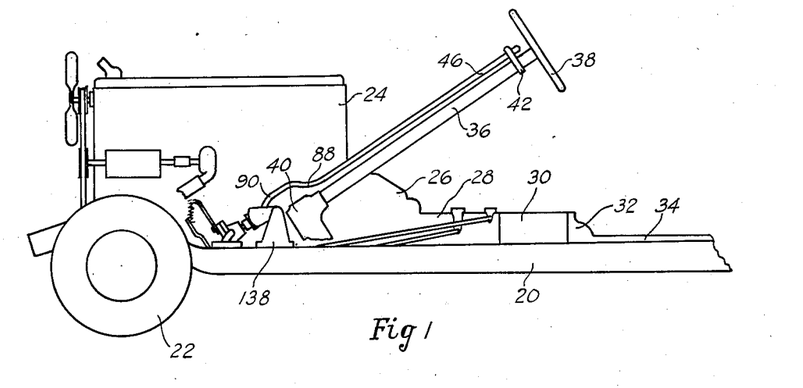
Figure 1 is a side elevational view of a portion of the motor vehicle with certain parts removed or broken away in order more clearly to illustrate the invention.

Referring more specifically to the drawings in which similar reference characters are employed throughout to designate similar parts, and which are to be taken solely as illustrative of the best mode of practicing the invention, the device of the invention, as shown, forms a part of an automobile which may be made up of the usual chassis frame 20, supported through springs (not shown) by wheels 22. The chassis frame 20 is provided with seats (not shown) from which a motor 24 is suspended. Motor 24 is adapted to be connected by a clutch 26 to a change speed transmission, the case of which is shown at 28 in Figure 1. The vehicle may be provided with an overdrive mechanism 30, which is connected at its rear end through a universal joint 32 and a driving connection 34 to the rear or power transmitting wheels of the vehicle (not shown).

The vehicle is equipped with a steering column 36 which supports a steering wheel 38 for rotating a shaft within the steering column operatively connected to a steering gear for rotating the front wheels 22 through a turning angle. The lower portion of the steering column is secured by means of a bracket 40 to an adjacent portion of the chassis frame 20.

Figures 2, 3, 4:
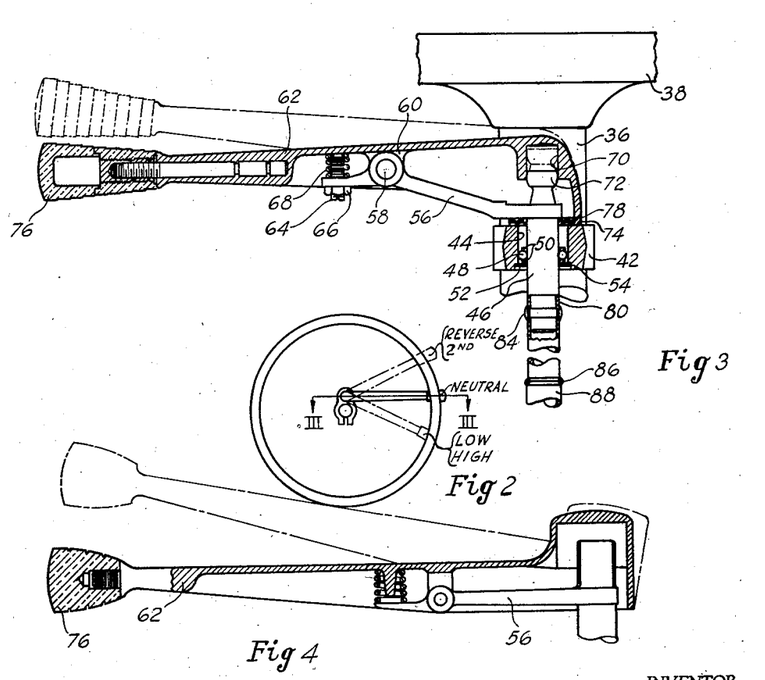
Figure 2 is a diagrammatic plan view of a steering wheel with a gear shifting lever in conjunction therewith.
Figure 3 is a vertical setcional view through the gear shifter lever shown in Figure 2 and taken substantially upon a plane as indicated by a line III—III of Figure 2.
Figure 4 is a view similar to Figure 3 but showing a modified type of lever.

Toward the upper portion of the steering column 36 and underlying the wheel 38 there is secured a collar 42 which encircles the steering column 36 and may be clamped thereto in any suitable manner. Collar 42 is provided with an offset cylindrically bored portion 44 within which is received a shaft 46. Shaft 46 is central within the bored portion 44 and is assisted for rotary movement therein by means of ball bearings 48 which are held in position by means of retainers 50. A washer 52 may be press fitted into a rabbetted portion 54 of the collar 42 in order to prevent ball bearings 48 from dropping out.

Just above the collar 42 the shaft 46 is encircled by a lever 56. Lever 56 has a splined and press fitted connection with shaft 46 in order that it may transmit rotary and axial movement to the shaft 46. Lever 56 is pivoted by means of a pin 58 between a pair of ears 60 depending from the underside of a manually operated lever 62. The free end of lever 56 terminates in an eye within which is threadedly received a screw 64, which is held in adjusted position by means of lock 66. The upper end of the screw 64 abuts against the under side of the manually operated lever 62 and serves to adjust the lower position of the lever 62 through a rather small range in order that it may properly clear the steering wheel 38. Screw 64 is encircled by a spring 68 which tends to move the eye portion of the lever 56 downwardly about the pivot point 58.

The steering column end of the manually operated lever 62 is provided upon its underside with a socket 70 for the reception of the partially spherical upper end 72 of shaft 46 to serve as a guide therefor. A silencing washer 74 of rubber or any other suitable material is interposed between the underside of the lever 62 and the upper portion of the collar 42.

It will be recognized that the upward movement upon the handle portion 76 of the lever 62 will result in the pivot point 58 being lifted and the lever 56 through its connection with the shaft 46 axially lifting the shaft 46 by rotation of lever 62 about its fulcrum point 78. In its upper position the shaft 46 through its contact with the socket 70 tends to maintain the lever 62 in its raised position. The lower end of the shaft 46 is shouldered as at 80 to receive a tubular member 82 which is secured thereto by means of a rivet 84. The lower end of the tubular member 82 may be welded as at 86 to a length of shaft 88.

Shaft 88 is provided with an upwardly bent portion 90, the purpose of which will be hereinafter explained.

Figure 5:
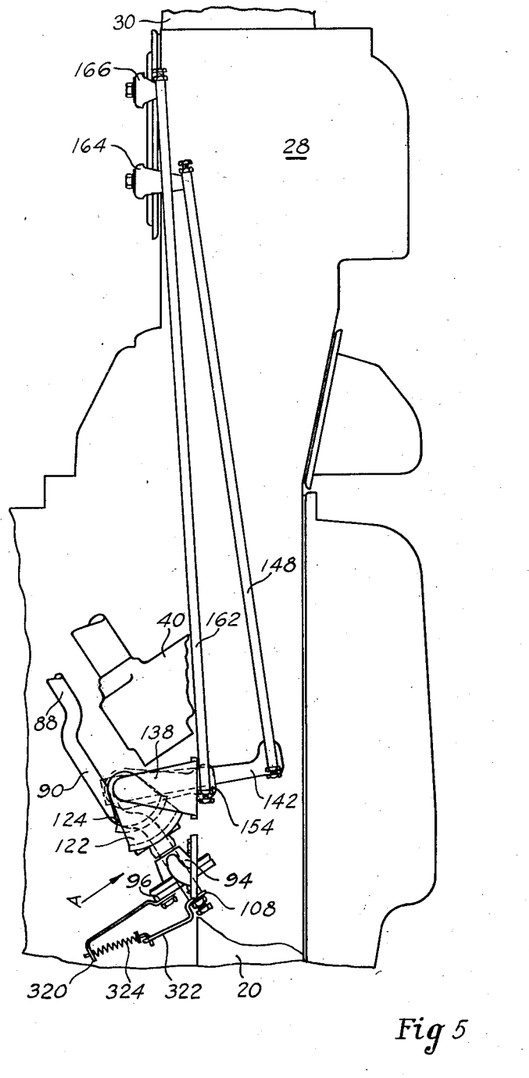
Figure 5 is a side elevational view similar to Figure 1 and on an enlarged scale with the frame partially broken away in order to more clearly show the parts.
Figure 6:
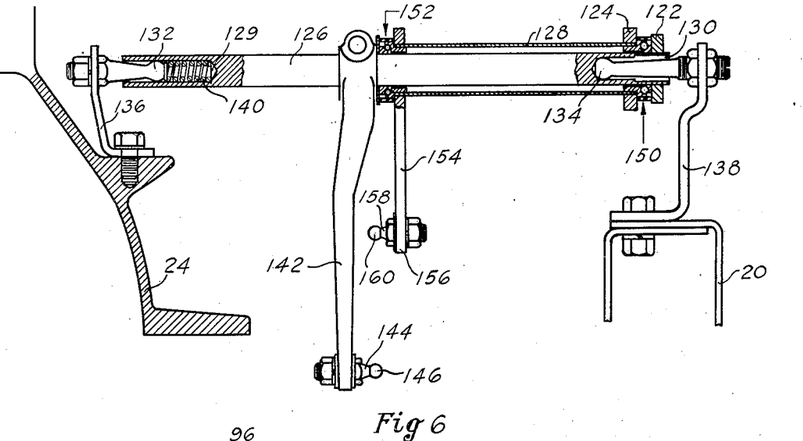
Figure 6 is a front elevational view partially in section of the parts shown upon the left hand side of Figure 5.
Figures 7, 8, 9:
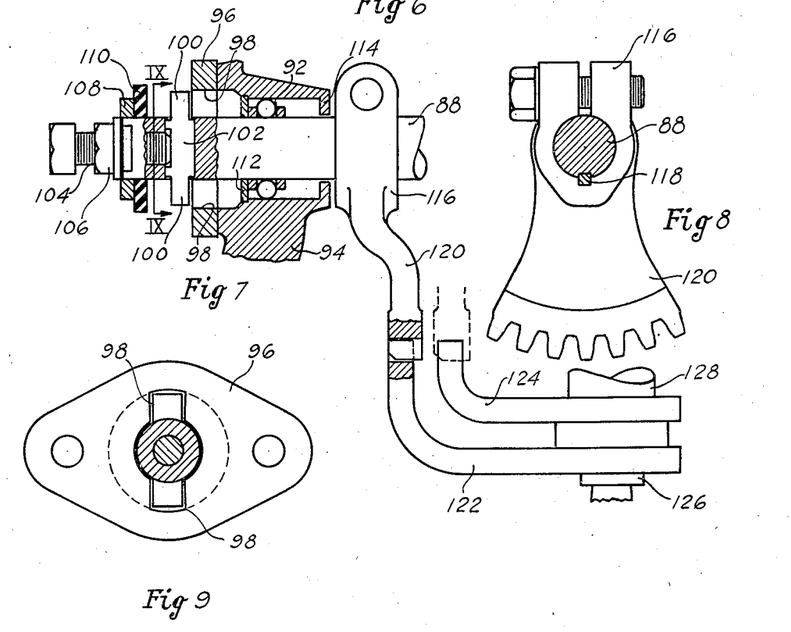
Figure 7 is a view looking in the direction of the arrow A of Figure 5, some of the parts being shown in section.
Figure 8 is a detail view of the pinion for operating the gear shifter.
Figure 9 is a sectional view taken substantially upon a plane, as indicated by the line IX—IX of Figure 7.

Referring more particularly to Figures 5 to 7, it will be noted that the shaft 88 terminates toward its lower end in a journal which is supported by means of a ball bearing 92 in a bracket 94, secured to the chassis frame 20 of the vehicle. Bracket 94 has secured to its underside a cross over plate 96 which is slotted at 98 (see Figure 9), and centrally apertured so as to receive and pass, in one position of angular rotation, the reduced ends 100 of pin 102, which is inserted in an aperture in the shaft 88 and held in place by means of a cap screw 104 threaded into a tapped opening in the lower end of the shaft 88. A lock nut 106 serves to hold the screw 104 in place and also acts to secure a star shaped washer 108 to the lower end of the shaft 88. The upper portion of the washer 108 is covered by rubber washer 110 which serves as a bumper for abutting the lower face of the cross over plate 96 to determine the upper limit of movement of the shaft 88.

It will be recognized that the ball bearing 92 is retained in a position by means of a press fitted washer 112 and by means of the overhanging flanged upper ends 114 of the bracket 94. The ball bearing 92 is similar to the bearing 48 and retainers 50 at the upper end of the shaft and facilitates both axial and rotative movement of the shaft.

The shaft 88 has attached thereto above the bracket 94 by means of a split collar 116 and a key 118 (see Figure 8) a gear segment 120 adapted for cooperation with face gears 122 or 124, which are carried by a rock shaft 126 and a tube 128 respectively (see Figure 6). Rock shaft 126 has its ends bored as at 129 and 130 to provide bearings within which are received ball shaped studs 132 and 134 carried by brackets 136 and 138 mounted upon the motor block 24 and the chassis frame 20, respectively.

Journal 134 may be seated in the bottom of its socket 130, while the journal 132 is provided with a coil spring 140 which extends between the bottom of the socket 129 and the spherical portion of the journal 132. Such construction is employed so that the motor which is resiliently mounted according to usual practice may oscillate slightly. Were this construction not used, the motor vibrations would be transmitted through the shaft 126 and would result in damage to the supports 132 and 134 and to their brackets 136 and 138. The shaft 126 has secured thereto a lever 142, the lower end of which carries a pin 144 adjustable within a slot therein, one end of such pin terminating in a spherical head 146 for engagement in a socket (not shown) in the end of a tubular link 148 (see Figure 5).

Face gear 124 (Figure 6) is fast upon tubular rock shaft 128 which encircles the rock shaft 126. The ends of the tubular rock shaft 128 are supported from the rock shaft 126 by means of ball bearings 150 and 152. Also fast upon the tube 128 is a lever 154, having a slotted lower end 156 in which a pin 158 is adjustable, such pin terminating in a spherical end 160 for reception within a socket (not shown) in the forward end of the tubular member 162 (see Figure 5). The rear end of the links 148 and 162 are provided with sockets (not shown) within which are received spherical heads (not shown) formed on the ends of levers 164 and 166, respectively; such levers serving to transmit the movements of the rods to suitable shift forks arranged within the transmission case 28 and which will presently be described.

Figure 10:
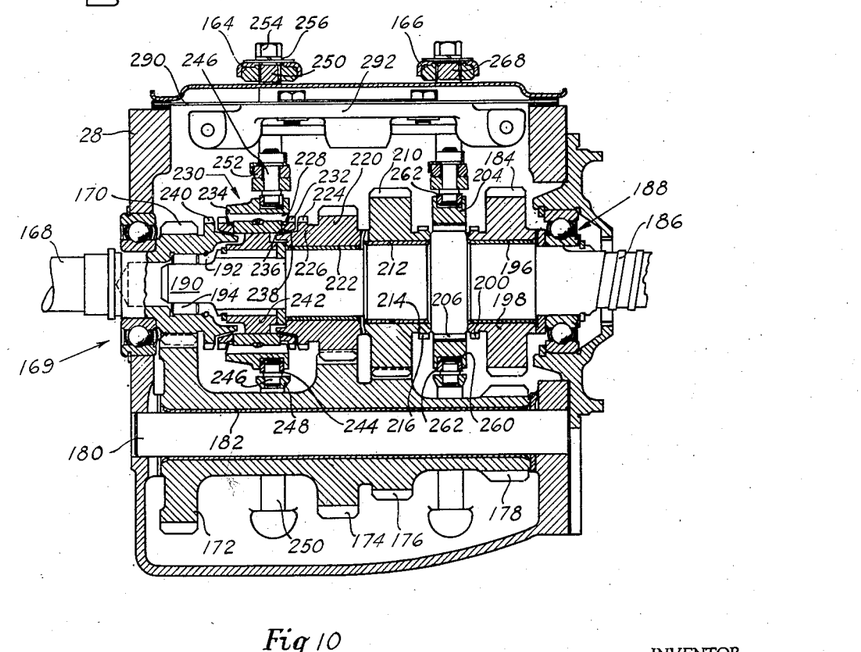
Figure 10 is a vertical longitudinal sectional view through the transmission mechanism shown upon the right side of Figure 5.
Figure 12:
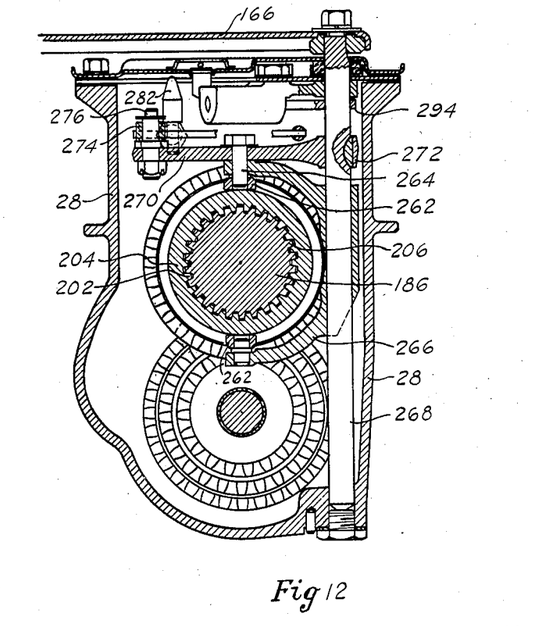
Figure 12 is a transverse vertical sectional view through the transmission shown in Figure 10.

Referring to Figures 10 and 12 wherein the transmission mechanism is shown more completely, it will be observed that the transmission gearing is enclosed within a casing 28 which may be bolted or otherwise suitably secured to the rearmost surface of the clutch housing 26 from which there extends the driving shaft 168, journaled in an anti-friction bearing 169, suitably secured in the wall of the transmission casing 28. The driving shaft 168 terminates within the transmission casing in a helical drive pinion 170 which is in constant mesh with a helical driven gear 172, integral with a set 174, 176, and 178 of gears mounted for rotation upon a countershaft 180, fast in a lower portion of the transmission case 28. The gear set 172, 174, 176 and 178 may be suitably bushed as at 182 upon the countershaft 180. Gear 178 is in constant mesh with an idler pinion (not shown) rotatably mounted upon a stub shaft fast within the transmission casing, which in turn is in constant mesh with a driven gear 184, upon a driven shaft 186 suitably carried by an anti-friction bearing 188 in the wall of the housing 28 and having a reduced forward end portion 190 which is received and journaled within a recess 192 in the driving shaft 168 upon roller bearings 194. A bushing 196 of anti-friction material may be interposed between the gear 184 and the driven shaft 186. The hub 198 of gear 184 is provided with external gear teeth 200, which are adapted to cooperate with internal teeth 202 (see Figure 12) formed in an axially shiftable clutch collar 204. The internal gear teeth 202 upon the clutch collar 204 mate with external teeth 206 formed integral with the driven shaft 186. It will thus be observed that when the collar 204 is shifted to the right, as viewed in Figure 10, the teeth 200 will mate with the teeth 202, which in turn will be engaged with the teeth 206 to complete the connection between the drive shaft 168 and the driven shaft 186 to drive a vehicle in reverse.

The countershaft gear 176 is in constant mesh with a gear 210, freely rotatable upon bushing 212 about the driven shaft 186. The hub 214 of the gear 210 is provided with teeth 216 which serve to mate with the internal teeth 202 upon the collar 204 when the collar is shifted to the left, as viewed in Figure 10. Teeth 202 are also meshed with the external teeth 206 on shaft 186, thus completing a drive connection between the driven shaft 186 and the driving shaft 168 to propel the vehicle forward at a low speed.

Countershaft gear 174 is in constant mesh with a gear 220 also carried by the driven shaft 186 through the medium of a bushing 222 and such gear 220 is provided with teeth 224 upon a hub 226 for mating with internal teeth 228, carried by a synchronizer device indicated generally at 230. While any desired type of synchronizer device may be employed in place of that shown, the one illustrated is of the so-called "blocker" type.

Blocker members 232 serve to prevent shifting movement of the clutch collar 234 until such time as the synchronizer clutch and the teeth 224 of the gear 220 are rotating at or near the same speed, rotation of the parts being brought about by the frictional engagement of a conical face 236 upon the blocker with a similar conical face 238 upon the hub or gear 220. Since such types of synchronizing devices are well known in the art of transmissions, this structure will not be further described at this time.

The end portion of driving shift 168 is provided with external teeth 240, which are adapted to mate with the teeth 228 of the synchronizer device 230 in the same manner as the teeth 224 of the gear 220. Frictional surfaces are provided upon the blocker 232 and upon the rear end of the driving shaft 168 similar to the surfaces 236 and 238 previously described.

The gear 220 serves to drive the vehicle forward at an intermediate speed while the connection of the synchronizer 230 to the teeth 240 acts to connect the driving shaft 168 directly to the driven shaft 186, the inner portion 242 of the synchronizing device being fast upon the shaft 186. The synchronizer clutch 230 has its shiftable portion 234 provided with a circular groove within which are received rollers 244 carried by stub shafts 246 secured upon opposite sides of the synchronizer collar 234 in a shift fork 248. Shift fork 248 is maintained in position by means of a vertical positioned rock shaft 250, which has keyed thereto a shifting lever 252 to assist in moving the fork 248. The upper end of the rock shaft 250 is provided with a splined portion with which the lever 164 is adapted to mate, said lever 164 being held in position upon the rock shaft 250 by means of nuts 254 and lock washer 256.

Figure 13:
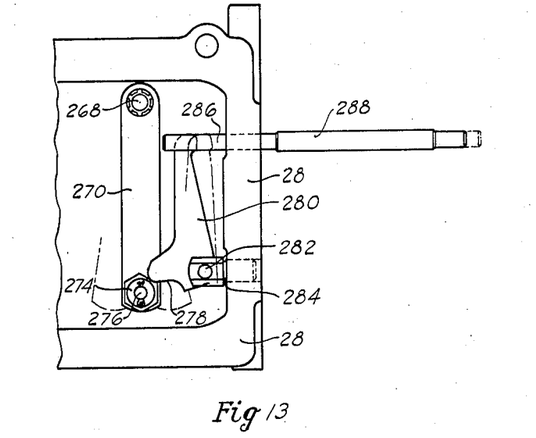
Figure 13 is a detail diagrammatic view illustrating a lock-out mechanism.

The clutch collar 204 which selects low or reverse gears is also provided with a circular groove 260 within which rollers 262 are received. The rollers 262 are supported upon stub shafts 264, which in turn are supported from a shift fork 266 (see Figure 12), carried upon a rock shaft 268. The upper stub 264 extends through and is tight with a shift lever 270, which has one end keyed as at 272 to the rock shaft 268. Rock shaft 268 is splined at its upper end to the lever 166, which is connected to the shifting link 162. The free end of shifting lever 270 carries a roller 274 upon a stub shaft 276 for engagement with a cam surface 278 (Figure 13) formed on a bell crank lever 280, pivoted at 282 to a fixture 284 carried by the wall of the casing 28. The opposite end of the bell crank lever 280 cooperates with the slotted end 286 of a lock out pin 288, which is adapted through suitable mechanism to disengage an overdrive, an overrunning clutch, or a hill brake so as to permit the transmission of power in a reverse direction along the driven shaft 186 to drive the vehicle in reverse.

The transmission casing 28 is provided with a false cover 290 which supports upon its underside a forging or casting 292 for holding detent pins which are spring pressed to indicate the limits of movement of the shift forks. Rock shaft 268 (Figure 11) has splined thereto a bell crank member 294 which has provided in its arm 296 a series of notches 298. When the rock shaft 268 and its shift fork end are in neutral position, the central notch 298 will be engaged by the tapered end of a pin 300 which is received within a hollow cylindrical portion 302 of the assembly 292. Pin 300 is spring pressed into engagement with notches 298. The central notch 298 is shallower than the two end notches and movement out of the end notches is thus rendered more difficult. Pin 300 thus serves to indicate to the operator of the vehicle when the limit of movement either into reverse gear or into first or low gear has been reached.

Figure 11:
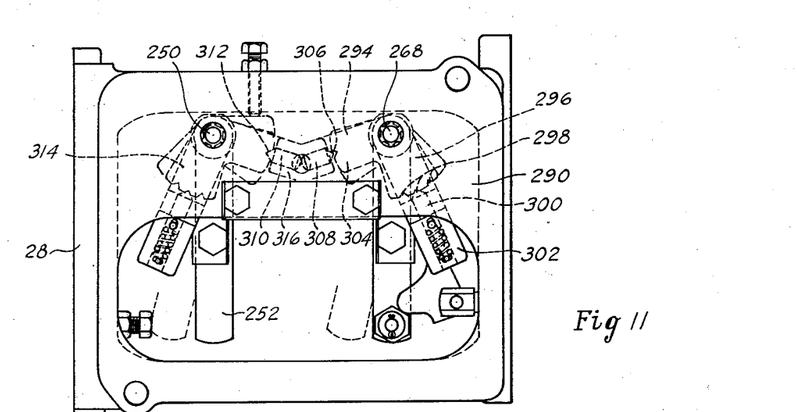
Figure 11 is a plan view of the transmission mechanism shown in Figure 10, certain parts being removed in order more clearly to show the invention.

The opposite arm 304 of the bell crank lever 294 is provided with a single notch 306 within which there is receivable a tapered end of a pin 308. The opposite end of the pin 308 is rounded and abuts against a similarly rounded end of a pin 310, which has a conical end for reception in a notch 312 in one arm of a bell crank lever 314 splined to the rock shaft 250. As a general rule sufficient clearance exists between the pins 308 and 310, which are carried in the angular portion 316 of the assembly 292, to enable either one or the other of the rock shafts 268 or 250 to be rotated. Movement of either of the rock shafts 250 or 268 depresses its corresponding pin and projects the opposite pin into the notch at its bell crank and effectively prevents movement of that rock shaft. This device serves to prevent shifting of one clutch to select a gear while the other clutch directly connects another gear to the driven and driving shafts.

Referring to Figure 5, the cross over plate 96 is there shown as provided with a bolt which secures a spring anchor 320 to its under surface. The washer 108 is provided with an extension 322 to the upper end of which is secured one end of a tension spring 324, the opposite end of this spring being anchored in the member 320. Spring 324 serves to rotate the shaft 88 to neutral position when the detent pins 300 are disengaged from the bottom of the notches 298.

The operation of the device will be observed to be as follows:

If it is desired to shift into reverse gear, the operator lifts upwardly upon the handle 76 thus raising the shaft 46, which is slidably mounted in its upper portion in ball bearings 48 and at its lower portion in bearings 92. This upward movement of the shaft 46, 88 shifts the gear segment 120 out of engagement with the face gear 122 and into engagement with the face gear 124, which is fast upon the tube 128. Forward movement of the handle 76 then rotates the pinion 120 downwardly as seen in Figure 7, carrying with it the face gear 124 and rotating the same in a counter-clockwise direction, as viewed in Figure 5. Counter-clockwise rotation of the face gear 124 results in rearward movement of the lever 154, link 162 and the lever 166, and moves the shift fork rock shaft 268 in a counter-clockwise direction, as viewed in Figures 11 and 13, thus shifting the collar 204 rearwardly and into engagement with the teeth 200 formed upon the hub of the gear 184. This movement of the shift fork 266 also serves through roller 274, cam surface 278 and lever 280 to propel pin 288 rearwardly to lock a free wheeling or overdrive device out of operative position. The vehicle will then be connected from driving shaft 168 through gear 170 and 172 through the countershaft to the reverse gear 178, the idler gear (not shown) and the gear 184 and clutch 204 with the driven shaft 186.

In order to shift the gears into low speed forward, it is only necessary from the reverse position to draw the shift handle 76 directly rearwardly and in elevated position to its limit of movement. This will result through the shaft 88, gear segment 120 and face gear 124, in the lever 154 being rotated in a clockwise direction as viewed in Figure 5, and in the clockwise rotation of the shift fork rock shaft 268, as viewed in Figures 11 and 13. Clockwise rotation of the rock shaft 268 results in disengagement of the collar 204 with the gear teeth 200 and movement of the same into engagement with the teeth 216 upon the hub of the gear 210. This movement also results in the withdrawal of the roller 274 from the cam surface 278 and permits the pin 288, which is spring pressed, to be retracted, thereby unlocking the free wheeling or overdrive which it controls. The vehicle is then conditioned for forward movement in low speed.

A shift to second speed is accomplished by moving the lever to the neutral position where the slot 98 in the cross over plate 96 permits the pin 100 to pass and drop to its lowermost position. With the pin 100 in its lowermost position, the parts have all been rotated to neutral and the gear segment 120 has been shifted out of engagement with the face gear 124 and into engagement with the face gear 122, carried by the shaft 126. Forward movement of the shift handle 76 results in downward movement of the gear segment 120 and face gear 122, as viewed in Figure 7, and in rearward movement of the link 148, as viewed in Figure 5. Rearward movement of the link 148 results in counter-clockwise movement of the shift fork lever 250 and in shifting of the clutch 230 to couple the driven shaft 186 and gear 220. The vehicle is then in condition for forward movement in intermediate or second speed.

With the vehicle in condition for second speed forward movement, a shift to high or direct drive is accomplished by pulling rearwardly upon the shift lever 76 with the lever remaining in its lowermost position. This will result in the rotation of the face gear 122 in a clockwise direction, as viewed in Figure 5, and in forward movement of the link 148 in the outer end of the lever 164 to rotate the shift fork rock shaft 250 in a counter-clockwise direction and couple the clutch teeth 240 with the shaft 186 by means of the synchronizer clutch 230. A return from this position to neutral is accomplished by pushing the lever forwardly to intermediate position.

It will thus be recognized that a device has been provided which accomplishes all of the objects set forth hereinbefore, which is relatively simple to manufacture and easy to install. While the invention has been described with considerable particularity, the foregoing description is not to be taken as limiting the invention but only as illustrating the best method of practicing the same. All equivalents falling within the scope of the appended claims are reserved.

I claim:

1. In combination with a transmission operated through two rock shafts from a steering column control, a casing for said transmission, a pair of transmission rock shafts journaled in said casing, a cover for said casing, top journals for said transmission rock shafts carried on said cover, a plate between said casing and said cover, a boss carried on said plate, lockout pins carried in said boss, and means fixed on said transmission rock shafts engageable with said lockout pins and being so arranged that movement of one transmission rock shaft from neutral position will rock the other transmission rock shaft in neutral position until said first transmission rock shaft is returned to a neutral position.

2. A motion transmitting device comprising a main shaft axially and rotatably movable, a gear segment on said shaft, a pair of rock shafts mounted for rotation transversely of said shaft, a face gear fixed to one of said rock shafts and having teeth arranged for engagement with the teeth of said gear segment, a face gear fixed to the other of said rock shafts and having teeth arranged for engagement with said gear segment, means for moving said shaft axially to engage one or the other of said face gears with said gear segment and for rotating said shaft to impart rotary movement to the corresponding rock shaft through its face gear, means for limiting the axial movement of said shaft and permitting axial movement only when it occupies a neutral position between its limits of rotative motion, said last mentioned means including a bumper on said main shaft, a pin through said shaft and a slotted plate around said shaft.

3. A motion transmitting device comprising, a main shaft having a gear segment fixedly mounted thereon, a pair of telescoped rock shafts each having a face gear engageable with said gear segment, means for rotating said main shaft when said gear segment is in mesh with one of said face gears, said means being shiftable to move the main shaft axially to place said gear segment and the other of said face gears in meshing relationship, means including a slotted plate and a pin through said main shaft to prevent rotative movement when neither of said face gears is in mesh with said gear segment.

4. A gear selecting device for automotive vehicles comprising a transmission containing selectable speed gears, a main shaft journaled on the steering column of said vehicle for axial and rotative movement, a gear segment carried by said shaft and selectively engageable with face gears carried on rock shafts extending transversely to said main shaft, each of said rock shafts being each operatively connected to separate shifting forks arranged within said transmission for selecting speed gears, and means including a pin in said transmission for preventing movement of one face gear and its rock shaft when the other face gear and rock shaft have been rotated to move its shifting fork into a speed gear selecting position.

5. In a change speed transmission, a case having a plurality of selectively engageable gear trains mounted therein, a pair of rock shafts positioned in said case and adjacent to one wall thereof, a shift fork on each rock shaft, each of said shift forks being adapted to select one or the other of two gear trains, a cover plate for said case, a pair of bosses secured to said cover plate, said bosses forming journals for said rock shafts, speed finder pins yieldingly mounted in said bosses and arranged to locate said rock shafts in either of their gear train engaging positions or neutral, a third boss secured to said cover plate between said pair of bosses and spaced inwardly from the wall of said casing, and lockout pins having hemispherical ends in abutting relationship positioned in said third boss, said lockout pins being positioned along lines forming an angle opening towards said wall and being operable to prevent rotation of either one of said rock shafts when the other of said rock shafts is in gear train engaging position.

6. A transmission interlock comprising a pair of pin guideways extending through a portion of a transmission case, said guideways being arranged at an angle with respect to one another, a pin in each guideway, the abutting ends of said pins being rounded and the opposite ends each being shaped to engage pin moving means carried by the transmission, the length of said pins with respect to said guideways being such that said opposite pin ends normally project only slightly from said guideways in a position for engagement with their respective pin moving means, engagement of said pin moving means with one of said opposite pin ends being adapted to cause retraction of said one pin into its guideway and projection of the other pin outwardly of its normal position in its guideway.

7. In a device of the class described, a first rock shaft, a first face gear tight on said rock shaft and presenting gear teeth arranged on a pitch circle concentric to the axis of said rock shaft, a second rock shaft telescoping said first rock shaft and having an axis coinciding with the axis of said first rock shaft, a second face gear tight on said second rock shaft and having gear teeth arranged on a pitch circle concentric to the axis of said second rock shaft and lying in the same plane as that of said first face gear teeth and a gear segment fixed to a shaft, said last mentioned shaft and said gear segment being shiftable into engagement with either of said face gears.

8. In a device of the class described, a first rock shaft, a first face gear tight on said rock shaft and presenting gear teeth arranged on a pitch circle concentric to the axis of said rock shaft, a second rock shaft telescoping said first rock shaft and having an axis coinciding with the axis of said first rock shaft, and a second face gear tight on said second rock shaft and having gear teeth arranged on a pitch circle concentric to the axis of said second rock shaft and lying in the same plane as that of said first face gear teeth, said pitch circles having different diameters, and a gear segment having gear teeth shiftable into engagement with one or the other of said face gears by movement in a path lying parallel to the plane of said pitch circles.

9. In a mechanism of the class described, a rock shaft, a face gear secured to said rock shaft and having gear teeth extending in a plane parallel to the axis of said rock shaft, a second shaft having an axis intersecting the axis of said rock shaft, a segment gear secured to said second shaft and having teeth extending radially with respect to the axis thereof, said segment teeth meshing with said face gear teeth to transmit power therethrough, said second shaft being reentrantly bent adjacent its point of intersection with said rock shaft in order to clear the same.

10. In an automobile having a flexibly mounted motor, a frame supporting said motor, a steering column mounted along the side of said motor, a shaft carried parallel to said shift column, said shaft having a reentrant bend, a gear segment carried on said shaft, a rock shaft, a journal for said rock shaft on said frame, an axially shiftable journal for said rock shaft on said motor, a face gear carried by said rock shaft, a second rock shaft journaled around said first rock shaft, a second face gear carried by said second rock shaft, said first shaft being shiftable to engage said gear segment with either of said face gears and linkage attached to said rock shafts for operating a transmission.

11. In an automobile having a frame, a motor flexibly mounted on said frame, a steering column mounted along the side of said motor, a main shaft mounted on said steering column and having a segment gear fixed thereon, a reentrant bend in said main shaft, a rock shaft intersecting the axis of said main shaft at a point within said reentrant bend, a fixed journal for said rock shaft on said frame, a sliding journal for said rock shaft on said motor, a second rock shaft journaled around said first rock shaft, face gears fast on said rock shafts, means for moving said main shaft to engage said segment gear with either of said face gears and link means connected to said rock shafts for operating a transmission.

12. In combination with a transmission operated through two rods from a steering column control, a casing for said transmission, a pair of transmission rock shafts journaled in said casing, a cover for said casing, top journals for said transmission rock shafts carried on said cover, a plate positioned between said casing and said cover, a boss carried on said plate, lockout pins carried in said boss in end to end relationship and at an angle to one another, and means fixed on said transmission rock shafts engageable with said lockout pins and being so arranged that movement of one rock shaft from neutral position will lock the rock shaft in neutral position until said first rock shaft is returned to neutral position, said plate defining an aperture through which the parts of said transmission are accessible.

NILS ERIK WAHLBERG.